May 6, 1969
D. A. MEADORS
3,442,656
METHOD OF SEPARATING PROTEIN INTO A FOOD CONCENTRATE
AND CHEMICAL SEPARATOR THEREFOR
Filed Oct. 20, 1965
Sheet _1_ of 3
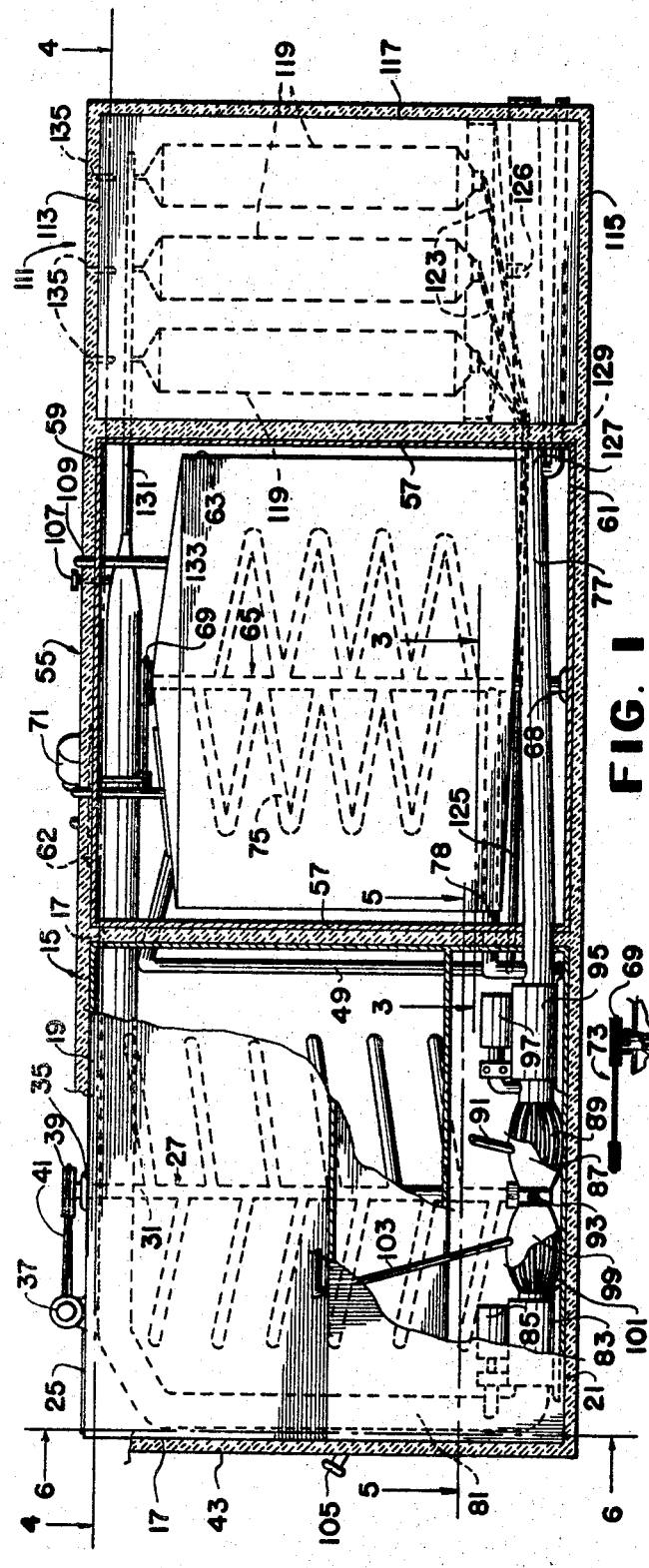
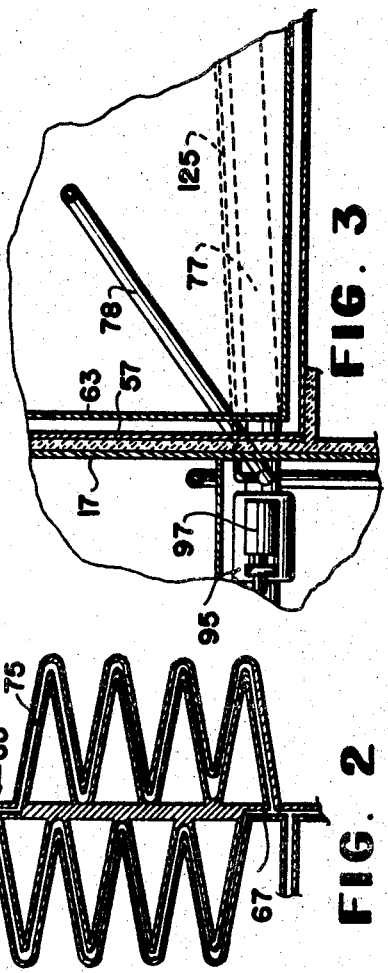
INVENTOR.
DENNIS A. MEADORS
BY *John H. Widdowson*
ATTORNEY

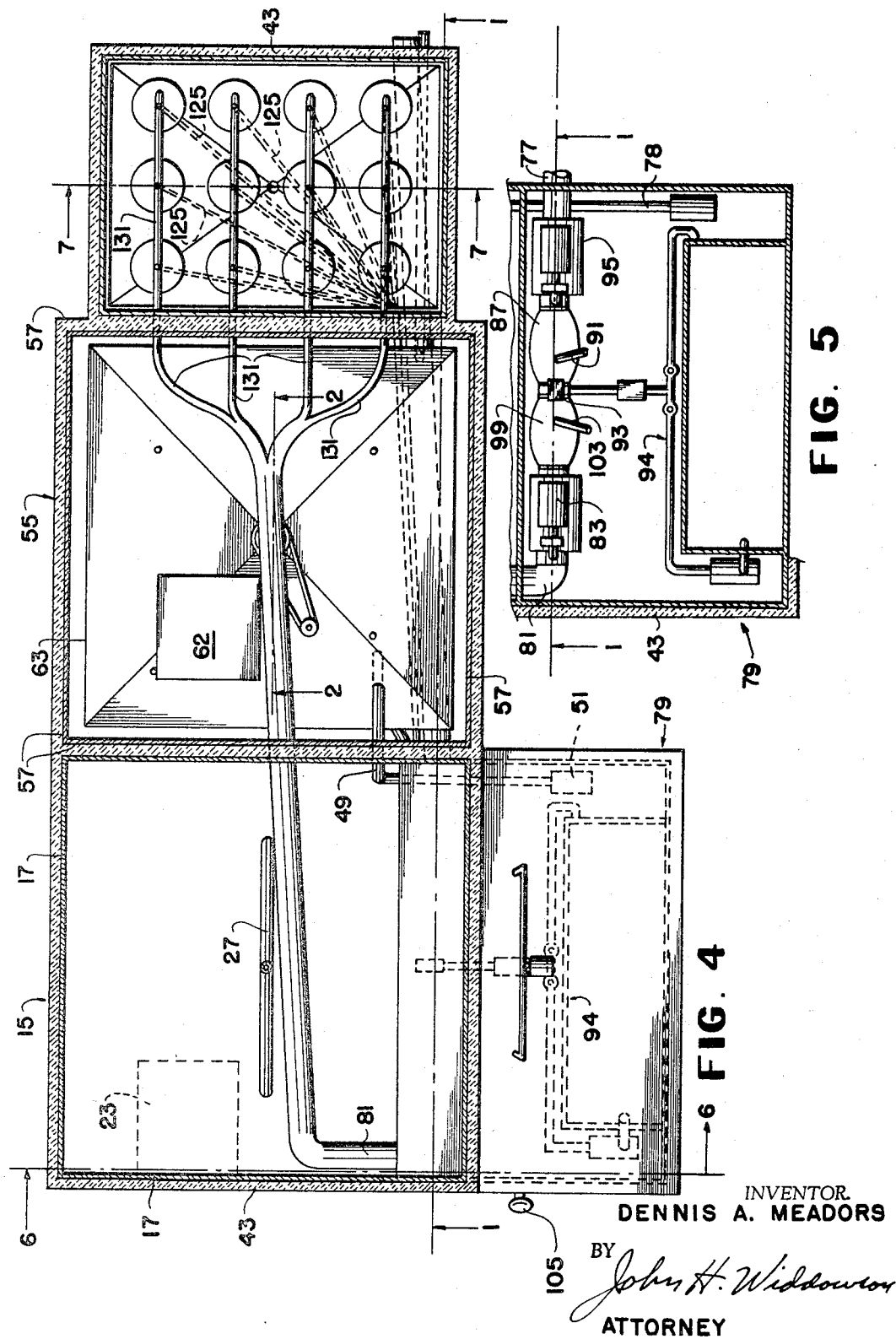
FIG. 5
FIG. 4
INVENTOR.
DENNIS A. MEADORS
BY 
ATTORNEY

INVENTOR.
DENNIS A. MEADORS
BY
*John H. Wilkinson*
ATTORNEY

United States Patent Office 3,442,656
Patented May 6, 1969

3,442,656
METHOD OF SEPARATING PROTEIN INTO A FOOD CONCENTRATE AND CHEMICAL SEPARATOR THEREFOR
Dennis A. Meadors, Rte. 2, Alma, Ark. 72921
Filed Oct. 20, 1965, Ser. No. 498,425
Int. Cl. A23j 1/14; C12d 13/06
U.S. Cl. 99—17                            6 Claims

ABSTRACT OF THE DISCLOSURE

The invention is a method and apparatus of processing raw protein materials into edible food. Enzymes are added to the prior fermented raw materials inside a porous inner portion of a processing tank with agitating means therein, and agitation is carried on. Nutrient collecting liquid is circulated around the porous inner portion, and the nutrients collected therein. The resulting nutrient containing liquor is oxidized, and passed into porous tubes in food collecting containers. Nutrients are passed through the tube wall and into the containers, and the resulting lean liquor is recycled to the process.

---

This invention relates to apparatus and a method for processing raw materials into edible foods, more particularly to a method and apparatus for chemically processing raw materials into edible meat-like foods.

Various methods and apparatus are known to the art for processing vegetable raw materials into high protein meat substitutes. These processes primarily involve the separation of the proteins from the vegetable matters and adding flavoring agents to create a synthetic meat flavor. Many times this process creates a product which is either too soft, or hard to adequately simulate a meat texture. The artificial flavoring does not adequately provide a true meat-like taste. Many of these processes known to the prior art require a complicated spinning apparatus to provide a protein fiber to simulate the meat fibers.

I have invented a new apparatus for processing raw materials into edible food which has a means for fermenting and agitating raw materials, means to extract nutrients from the raw materials, and means to accumulate these nutrients as edible foods.

The new method of my invention provides for fermenting raw materials, adding catalysts thereto, extracting nutrients therefrom, and depositing these nutrients in containers as edible foods.

My new apparatus and method provide a means to produce a meat-like product by a chemical process. It is not necessary in my invention to artificially create fibrous protein by spinning methods or the like, inasmuch as my invention chemically provides meat-like texture in the end product. Furthermore, artificial flavoring is not necessary in my invention inasmuch as the flavor is controlled by the mixture of the raw materials processed by my invention.

The apparatus of my invention is sufficiently versatile to produce various types of simulated meat products, here again depending upon the mixture of ingredients used in the process.

It is an object of this invention to provide a new apparatus for processing foods.

Another object of this invention is to provide a new method of processing food.

Still another object of this invention is to provide a new apparatus and method for chemically processing vegetables and raw materials into a meat-like product.

And still another object of this invention is to provide a new apparatus and method for producing various types and flavors of meat-like products from vegetable raw materials.

Various other objects, advantages, and features of the invention will become apparent to those skilled in the art from reading this disclosure.

Drawings accompany and are a part of this disclosure. These drawings depict preferred specific embodiments of the chemical separator of the invention, and it is to be understood that these drawings are not to unduly limit the scope of the invention. In the drawings, FIG. 1 is a partial sectional view of the apparatus taken along the line 1—1 in FIGS. 4 and 5.

FIG. 2 is a partial section taken along line 2—2 of FIG. 4.

FIG. 3 is a plan view taken along line 3—3 of FIG. 1.

FIG. 4 is a plan view taken along line 4—4 of FIG. 1.

FIG. 5 is a plan view taken along line 5—5 of FIG. 1.

Figure 6:
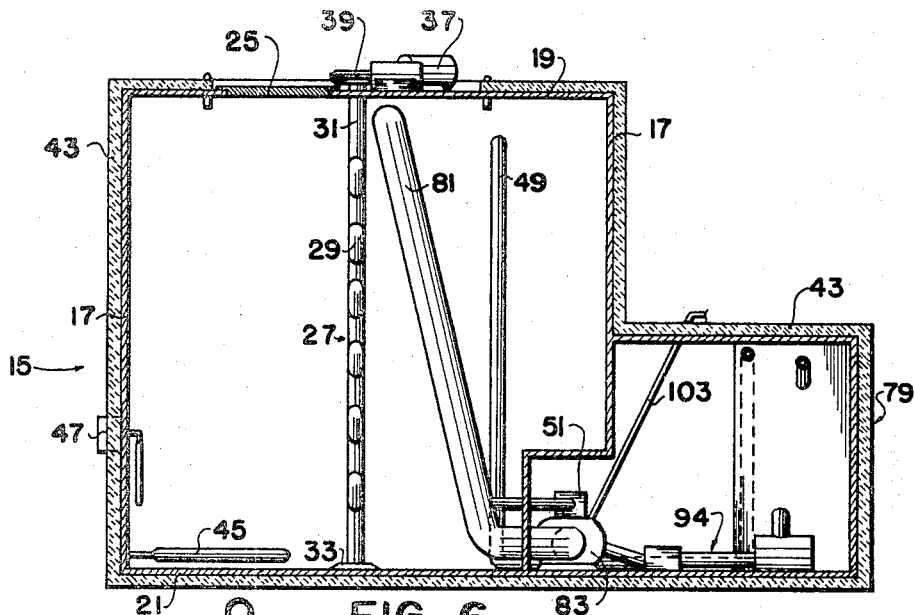
FIG. 6 is a sectional view along line 6—6 of FIGS. 1 and 4.
Figure 8:
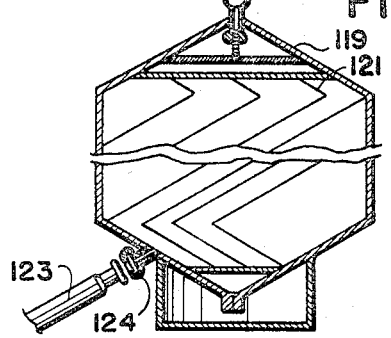
FIG. 8 is a partial section of the food container of the invention taken along line 8—8 of FIG. 4.
Figure 7:
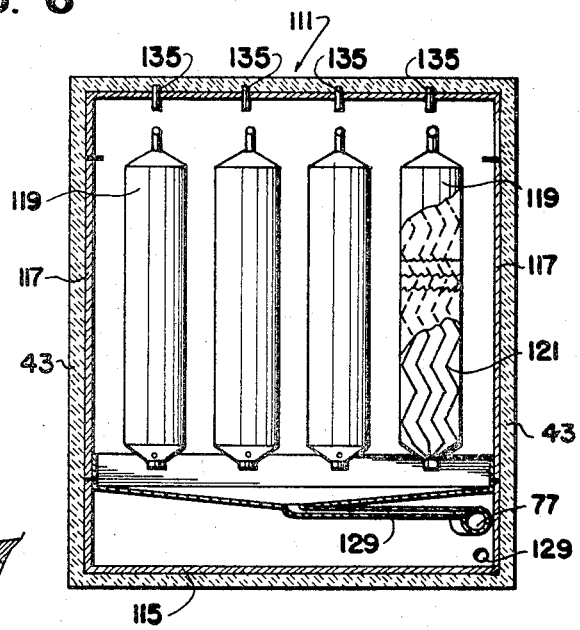
FIG. 7 is a partial sectional view taken along line 7—7 of FIG. 4.
Figure 9:
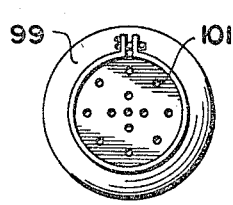
FIG. 9 is an end view of the oxidizing tank of the invention.
Figure 10:
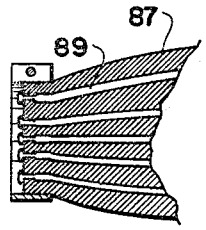
FIG. 10 is a partial section of the purging tank of the invention taken along line 1—1 of FIG. 4.

In the following is a discussion and description of the invention made with reference to the drawings whereon the same reference numerals are used to indicate the same or similar parts and/or structure. The discussion and description is of preferred specific embodiments of the new chemical separator of the invention, and it is to be understood that the discussion and description is not to unduly limit the scope of the invention.

The chemical separator of my invention has a box-like fermentation tank 15. This tank can be constructed of any suitable material such as metal, plastic or the like but preferably of steel. The tank has outer walls 17, a top 19 and a bottom 21. An inlet aperture 23 for introducing raw materials into the tank 15 is provided in the top 19. An inlet lid 25 is preferably hingedly mounted to cover the inlet 23. An agitator 27 is vertically and turnably mounted in a central portion of the tank 15. This agitator 27 can be of any suitable design to mix raw materials in the tank 15, but preferably with a shaft 31 which has projecting arm members 29. This agitator 27 can be made of any suitable material such as metal or plastic but preferably of stainless steel. Bearing means 33 are mounted on the bottom 21 to support the agitator 27. Bearing means 35 are mounted in the top 19 with the top end portion of the shaft 31 projecting therethrough. A motor 37 is mounted on the top 19 to provide powering means for rotation of the agitator 27. This motor 27 can be of any suitable type, but preferably an electric motor. Means to drive the agitator 31 by the motor 37 can be any suitable type such as gearing, chain drive or the like, but preferably by V-belts and pulleys. A pulley 39 is rigidly mounted on the projecting end portion of the shaft 31 and is drivingly connected to the motor 37 by a V-belt 41.

Tank 15 is preferably enclosed by insulation. This insulation 43 can be of any suitable type such as cork, asbestos, or plastic, but preferably of a uni-cellular polyurethane Styrofoam plastic or the like. Heating means are provided to maintain temperature in the tank at approximately 98° F. This heating means can be any suitable type such as gas or electricity, but preferably an electrical heating coil mounted in the lower portion of the tank 15. A thermostat 47 is operably connected between the coil 45 and the tank 15 to maintain the temperature as aforesaid. The motor, thermostat and heating means are all operably connected to a source of electric power (not shown).

A transfer conduit 49 is mounted in the tank 15 and has an inlet end portion mounted near the bottom of the tank 15. Conduit 49 can be made of any suitable material such as plastic or metal, but preferably of stainless steel. A transfer pump 51 is operably mounted in transfer conduit 49. This pump can be of any suitable type such as reciprocating, centrifugal, or the like, but preferably a centrifugal pump. The pump 51 is drivingly connected to a powering means. The powering means is preferably an electric motor 53. Gearing (not shown) preferably drivingly connects the pump 51 and the motor 53.

A box-like processing tank generally referred to at 55 is mounted adjacent to the fermentation tank 15. It has outer walls 57, a top 59 and a bottom 61. An inspection door 62 is provided on the top 59. This tank can be made of any suitable material such as metal or plastic but preferably of stainless steel.

An inner tank 63 is mounted within tank 55. Inner tank 63 is smaller than tank 55 to provide space between tanks 63 and 55 for circulating liquids between them. In large embodiments of my invention, a supporting frame (not shown) can be mounted in tank 55 to provide additional rigidity and support for tank 63 when so mounted. This frame can be made of any suitable material such as metal or plastic but preferably of stainless steel. Tank 63 is made of a suitable porous material which has a porosity to pass amino acids therethrough. This tank 63 is preferably made of any suitable plastic material which has the porosity as aforesaid.

A processing agitator referred to generally at 65 is mounted in a central portion of the inner tank 63. A hollow shaft portion 67 projects upwardly through the central top portion of the tank 63, and the lower end of the shaft portion 67 projects through the bottom portion of tank 63. Bearing means 68 are mounted on the bottom of tank 55 to support the shaft portion 67. A pulley 69 is preferably mounted on the upwardly projecting end portion of shaft 67. Means to rotate the shaft 65 are provided. This can be any suitable powering means, but preferably is an electric motor 71 mounted on the top 59 operably connected by shaft pulley and belt means 73 to the pulley 69. The agitator 65 has a plurality of hollow V-shaped arm portions 75 projecting outwardly from the shaft portion 67 and intercommunicating therewith. Agitator 65 is preferably constructed of any suitable plastic material having a porosity such as to allow the passage of fats and lipoids therethrough.

A liquor return duct 77 is mounted in the bottom portion of the processing tank 55 between the bottom portion of the inner tank 63 and the bottom 61. The return duct 77 projects through opposing sides 57 of tank 55. The shaft portion 67 of the agitator 65 intercommunicates with the return duct 77 through drain line 78. A liquor storage tank referred to generally at 79 is mounted adjacent to the fermentation tank 15. A liquor discharge line 81 is mounted in the storage tank 79 and projects upwardly through a top portion thereof, passing through fermentation tank 15 and into processing tank 55. A liquor circulating pump 83 is operably mounted in the discharge line 81. Pump 83 can be of any suitable type but preferably of a reciprocating piston type pump. An electrical motor 85 is preferably operably connected to pump 83.

A carbon dioxide purging tank 87 is mounted adjacent to the storage tank 79. This tank has a plurality of tubes 89 generally longitudinally mounted therein. These tubes 89 can be made of any suitable plastic porous material which will allow the passage therethrough of carbon dioxide. A vent 91 is mounted on the tank 87 to discharge carbon dioxide therefrom to the atmosphere.

A valve 93 is mounted on the outlet end portion of tank 87. This valve 93 can be of any suitable type such as globe, gate, or the like, but preferably a gate valve. Liquor collecting lines in 94 in tank 79 intercommunicate with valve 93. The liquor return duct 77 intercommunicates with the inlet end portion of purging tank 89. A booster pump 95 is operably mounted in the return duct 77. Pump 95 is preferably of a reciprocating type and is operably connected to a powering means, preferably an electric motor 97. An oxidizing tank 99 is mounted adjacent valve 93 and has a plurality of substantially longitudinally mounted tubes 101 therein. These tubes 101 are preferably constructed of a plastic material having a porosity to pass molecules of oxygen therethrough. An oxygen supply line 103 is operably connected between a source of oxygen (not shown) and the tank 99. The discharge end portion of the oxidizing tank 99 intercommunicates with the storage tank 79.

The liquor discharge line 81 intercommunicates with the processing agitator 65 and the space between the inner tank portion 63 and the outer tank portion of processing tank 55. An additive tube 105 is mounted in a side 17 of tank 15 for adding chemicals to tank 15. A valve 107 is operably mounted in line 81 to stop the flow of liquor beyond the tank 55. A vent 109 intercommunicates with the inner tank 53 and projects through the top 59 of tank 65 to the atmosphere.

A product collecting tank generally referred to at 111 is mounted adjacent to the processing tank 55. This tank 111 has a top 113, a bottom 115 and sides 117. A plurality of food containers 119 are mounted in the tank 111. There can be any suitable number of food containers 119 but preferably 12. Each of the food containers 119 has a plurality of relatively small porous tubes 121 mounted in a generally zig-zag pattern. These tubes 121 can be made of any suitable plastic material which has a porosity to pass amino acids, fats, oxygen, carbohydrates, minerals, and bacterial killing liquid catalysts therethrough. These catalysts can be of any suitable kind, preferably such as those formed in lymph glands of cattle, hogs, sheep, and the like. The food containers 119 are preferably cylindrical in shape and preferably are made of a relatively thin impermeable material such as plastic, natural protein animal membrane or the like, but preferably of a plastic material. A drain line 123 is mounted on the bottom portion of each of the containers 119 and has a plastic filtering means 124 therein, so as to allow only the passage of bacterial killing catalysts therethrough. These drain lines 123 intercommunicate with the return duct 77 through line 125.

The liquor after having passed through tubes 121 in the food containers 119 passes through the bottom portions of each of the food containers 119 and into a drain line 126 which intercommunicates with the return duct 77.

A filter 127 is mounted in the return duct 77 between the tank 111 and transfer pump 95. This filter is constructed to filter out waste materials from the liquor, more particularly the bacteria which have been destroyed by the bacteria killing catalysts. A drain line 129 intercommunicates with the filter 127 and drains the waste material therefrom.

Liquor discharge line 81 separates into branch lines 131 between the cut-off valve 107 and tank 111. These branch lines 131 intercommunicate with the tubes 121 in the top portion of each of the food containers 119. Between the branch lines 131 and the liquor discharge line 81, an upwardly sloping portion 133 is provided to allow the passage of the lighter ends of the liquor over into lines 131, permitting the heavier end portions to recirculate through tank 55.

A plurality of escape vents 135 are provided through the top 113 of tank 111 and project into tank 111, preferably one escape vent is mounted immediately above each food container 119.

Tanks 55 and 111 are preferably provided with electrical heating means and thermostat means similar to those hereinbefore described in tank 15. These heating means maintain temperatures in tanks 155 and 111 at approximately 98 degrees F.

Insulation is preferably provided around tanks 55 and 111. This insulation can be of any suitable type but preferably as hereinbefore described for tank 15.

The new method of processing raw materials into concentrated edible food of my invention can be used in connection with the apparatus hereinbefore described. However, this method is not limited to the apparatus and can be used in connection with other apparatus other than hereinbefore set forth. For the sake of clarity, the method will be described herein in conjunction with the apparatus of my invention.

A mixture of finely ground vegetable raw materials is placed in the fermentation tank 15 through lid 25. These raw materials can be of any suitable kind of protein containing vegetable matter, such as soybean, alfalfa, grains, and the like. The mixture of ingredients can be varied to provide a variety of end food products. Water is added to the mixture in tank 15 to create a mash which is sufficiently liquid to be agitated and pumped. The electric heating means 45 and thermostat 47 are set to maintain the temperature of the mixture at approximately 98 degrees F. The agitator motor 37 is started to rotate the agitator 27 during the fermentation process. This process should be continued for approximately eight hours. During the fermentation process, natural bacteria is formed which creates useful acids such as hydrochloric which further aid in chemically separating component parts of the raw materials. In this process the cellulose and pentosans inherent in the mixture are broken down into organic acids, chiefly acetic and butyric. Glucose and other sugars are also formed through the bacterial action. Gases, chiefly carbon dioxide and methane are exhausted from tank 15 through vents provided.

After eight hours of agitation in the fermentation tank 15, the resultant mixture is transferred from tank 15 through transfer conduits 49 into the inner portion 63 of tank 55. The mixture is transferred by pump 95. The agitator 65 in processing tank 55 is started by starting the motor 71. The temperature in tank 63 is maintained at 98 degrees F.

Enzymes are now added to the mixture in tank 63. These enzymes are principally trypsin, amylase, and lipase. The trypsin attacks the proteins and creates proteses, peptones, and some amino acids. The amylase changes the starches into malt, sugar, and the like. The lipase splits the fats in the mixture into fatty acids and glycerine. Suitable salts such as those found in bile are added to aid in breaking down the fats in the mixture. Erepsin is added which attacks the proteses and peptones resulting in the production of amino acids therefrom. Invertase is added which hydrolysis sugars in the mixture. A liquor is placed in the storage tank 79. The beginning solution of this liquor is primarily water and can be all water. However, faster results can be obtained by including 5 percent glucose, 1 percent salt and 1 percent soluble iron in the liquor. The liquor is pumped from the storage tank 79 by pump 83 through the liquor discharge line 81 in sufficient quantity to fill the space between the outside portion of tank 55 and the inner tank 63. The valve 107 is closed. The liquor absorbs amino acids through the porous walls of inner tank 63 as well as some of the fatty acids. A portion of the liquor circulates through the hollow agitator 65 and absorbs fats, lipoids and the like through the porous materials of agitator 65. The liquor drains into the return duct 77, through pump 95 and into purging tank 87, passing through the tubes 89 therein wherein carbon dioxide escapes from the liquor and is vented through vent 91. The liquor then passes into an oxidizing tank 99 and through the tubes 101 therein. Oxygen under pressure is supplied to the tank 99 through line 103 thereby passing oxygen through the porous tubes 101 and into the liquor. The liquor is then passed through pump 83 for recirculation through the discharge line 81. During this circulating process the pump 83 pumps the liquor in surges during the circulation hereinbefore described.

After circulating the liquor through the processing tank for six hours, valve 107 is opened allowing the lighter ends of the liquor containing the greater part of the nutrients extracted from tank 55, to pass into the branch lines 131 and into the porous tubes 121 of the food containers 119 in tank 111. Approximately one-third of the liquor enters the food containers 119, the remaining portion thereof recirculating through tank 55. As the liquor passes through the tubes 121 in a zig-zag fashion, the nutrients which include amino acids, fats, oxygen, carborates, minerals and vitamins pass through the porous walls of the tubes 121 and are deposited in the food storage container 119. The tubes 121 are preferably held in place in the food containers 119 by a plurality of grids made of protein fibers. These fibers tend to become absorbed in the product and provide additional chewey texture. Fibers of this sort are well known to the art and any suitable kind can be used.

Bacteria killing catalysts are also passed through the tubes 121 and into the food compartment 119. However, these catalysts are allowed to drain from the food container through drain lines 123 as hereinbefore described. The waste products therefrom being removed by filtration.

The liquor that has passed through the tubes 121 is returned to the return ducts 77 by duct 126 for recirculation.

After the food materials have been deposited from the food containers 119, another chemical reaction occurs which is a metabolic and anabolic process that forms a cellulose like product containing nucleic acid, a compound of heterocyclic nitrogenous bases, sugar, and phosphoric acid. During this process the carbohydrates and fats are oxidized to carbon dioxide and water which are returned to the return ducts 77 in the circulating system.

During the circulating process last-described, the pump 95 is preferably operated at a speed of approximately 60 strokes per minute and pump 83 is preferably timed to operate at approximately 180 strokes per minute. This circulating process should be continued for approximately ten to twelve hours or until the food containers 119 are filled.

Example I

An example of the method of my invention to produce a synthetic meat-like product resembling pork is as follows: (1) The mixture of starting ingredients to be placed in the fermentation tank is 1700 pounds of corn or sorghum grains, 100 pounds of tankage, meat scraps, or fish meal, 100 pounds of soybean meal, cotton seed meal or linseed meal, and 100 pounds of alfalfa. Six-hundred gallons of water are added to the mixture. It is preferable to add certain additives to the starting mixture during the fermentation phase. Comparatively small amounts of hydrocholic acid, pepsin, talomatic acid and rennin aid in the separation of the chemicals during the fermentation stage. (2) This mixture is processed as hereinbefore described. (3) The end product will contain approximately 64 percent water, 28.5 percent fats, 14.5 percent protein and 2.7 percent minerals. The food thus produced can be handled and stored in a manner similar to that of pork, and has a similar color and taste.

Example II

A preferred mixture of ingredients to produce a synthetic meat-like food having a beef flavor is as follows:

(1) The beginning in the fermentation tank contains 600 pounds of alfalfa, 1200 pounds of corn or grain or sorghum, 180 pounds of cottonseed oil, soybean meal or the like, 6⅔ pounds of defloriated phosphate, 6⅔ pounds of ground limestone, 6⅔ pounds of salt granules to which is added 1200 gallons of water. After processing this mixture as hereinbefore described, the resultant end product will have approximately 43.5 percent water, 15.7 percent proteins, 37.6 percent fats, and 3.2 percent minerals. Here again the end product closely resembles color and taste of beef and can be handled and treated in a similar fashion.

It will be apparent to those skilled in the art that the apparatus and method of my invention can be used to simulate many other meat products by varying the mixtures of ingredients which are put through the processing.

The foregoing discussion and description has been made in connection with preferred specific embodiments of the chemical separator of the invention. However, it is to be understood that the discussion and description is only intended to illustrate and teach those skilled in the art how to practice the invention, and such is not to unduly limit the scope of the invention, which is defined in the claims set forth hereinafter.

I claim:

1. A chemical separator comprising, in combination, a box-like fermentation tank having outer walls, a top having an inlet for introducing raw materials, a bottom, an agitator turnably and vertically mounted in a central portion of said tank between said top and said bottom, a shaft portion of said agitator having an end portion projecting through said top, an agitator drive pulley mounted on the said projecting end portion of said shaft portion, an electric motor mounted on said top and drivingly connected to said pulley by belt means, insulation mounted on said walls, said top, and said bottom, electric heating means mounted in said tank, a thermostat mounted on said tank and operably connected to said heating means, said motor heating means and said thermostat operably connected to a source of electric power, a lid hingedly mounted on said top to close said inlet therein, a transfer conduit mounted in said tank having an inlet end portion mounted near the said bottom of said tank, a transfer pump operably mounted in said transfer conduit, a box-like processing tank mounted adjacent said fermentation tank, said processing tank having outer walls, an outer top, and an outer bottom, an inner tank portion of said processing tank having inner tank walls, an inner tank top, and an inner tank bottom of a porous material constructed and adapted to passs molecules of amino acids therethrough, a processing agitator mounted in a central portion of said inner tank having a shaft portion projecting through the said top of said inner tank, a pulley mounted on the said projecting end portion of said last-named shaft, a processing motor mounted on a top portion of said outer top of said processing tank, said last-named motor drivingly connected to said last-named pulley by shaft and belt means, said processing tank agitator having a porous hollow shaft portion, a plurality of V-shaped porous hollow arm portions projecting from and intercommunicating with said hollow shaft portion, a liquor return duct mounted in the bottom portion of said processing tank and below said inner tank, said duct intercommunicating with said processing tank agitator shaft, a liquor storage tank mounted adjacent said fermentation tank, a liquor discharge line mounted therein, a liquor circulating pump operably mounted in said discharge line, a carbon dioxide purging tank mounted adjacent said storage tank having a plurality of capillary tubes therein of a material having a porosity to discharge carbon dioxide gases therethrough, vent means mounted on said carbon dioxide purging tank, valve means mounted on the discharge end portion of said purging tank, said liquor return duct intercommunicating with said purging tank, an oxidizing tank mounted adjacent said last-named valve means intercommunicable with said purging tank, said oxidizing tank having thin walled tubes of porous material mounted therein to pass oxygen into said liquor, means for supplying oxygen to said oxidizing tank from a source of oxygen, a discharge end portion of said oxidizing tank intercommunicating with said storage tank, said liquor discharge line intercommunicating with said processing tank, apertures in said discharge line in said processing tank, said discharge line intercommunicating with said processing tank agitator, valve means mounted on said liquor discharge line, a product collecting tank mounted adjacent said processing tank having a top, a bottom, walls, a plurality of food containers mounted in said product collecting tank, each of said food containers having a plurality of tubes mounted therein in a zig-zag pattern, said tubes constructed of a porous material which allows the passage of nutrients and bacteria killing liquid catalysts therethrough, the outside portion of said food containers constructed of a thin impermeable material, a catalyst drain line mounted on the bottom end portion of each of said containers, said last-named drain lines intercommunicating with said liquor return duct, filtering means in said last-named drain lines between said food containers and said liquor return duct, said liquor discharge line passing into said product collecting tank and having relatively small branch lines intercommunicating with a top portion of said tubes in each of said food containers, drain lines mounted in the bottom portion of each of said food containers and connected between said liquor return duct and the bottom portions of said last-named tubes, filtering means mounted in said return duct between said food containers and said purging tank, said chemical separator constructed and adapted to process food therein by fermenting raw material in said fermentation tank, transferring said raw materials to said processing tank through said transfer conduit, passing liquor from said liquor storage tank through said liquor discharge line into said processing tank, a portion of said liquor passing into and through said processing tank agitator, the remainder of said liquor filling the space between the outer walls and said inner tank portion, said liquor absorbing nutrients from said processing tank through said processing tank walls of said inner portion and through said agitator, said liquor returning through said liquor returning duct and into said carbon dioxide purging tank, carbon dioxide exhausted therefrom, said liquor passing through said valve means and into said oxidizing tank, said liquor absorbing oxygen therein, opening said liquor discharge line, valve means, a portion of said liquor passing through said liquor discharge line and into said product collecting tank, through said tubes in said food containers, nutrients from said liquor passing through the walls of said tubes in said food containers and being deposited therein, the remaining portion of said liquor passing out the bottom of said food containers and into said liquor return duct and said storage tank.

2. A chemical separator comprising in combination, a box-like fermentation tank, an agitator turnably mounted in said fermentation tank, means to rotate said agitator, heating means mounted on said tank, thermostat means operably connected to said heating means, a lid mounted on a top portion of said fermentation tank, a transfer conduit mounted in said tank having an inlet end portion mounted in close proximity to the bottom of said tank, a transfer pump operably mounted in said transfer conduit, a box-like processing tank mounted adjacent said fermentation tank, said processing tank having an inner tank portion of porous material, liquor circulating space between said inner tank and said processing tank, a hollow porous processing agitator mounted in said inner tank, means to rotate said processing agitator, a liquor return duct mounted in the bottom portion of said processing tank and below said inner tank, said processing tank agitator intercommunicating with said liquor return duct, a liquor storage tank mounted adjacent said fermentation tank, a liquor discharge line mounted therein, a liquor circulating pump operably mounted in said liquor discharge line, a carbon dioxide purging tank mounted in said liquor return duct and intercommunicating therewith, means to discharge carbon dioxide from said liquor in said purging tank, an oxidizing tank mounted adjacent said purging tank and intercommunicating therewith, means to oxidize said liquor in said oxidizing tank, said oxidizing tank intercommunicating with said storage tank, said liquor discharge line intercommunicating with said processing tank and said processing tank agitator, valve means mounted in said liquor discharge line, a product collecting tank mounted adjacent said processing tank having a plurality of food containers mounted therein, each of said food containers having a plurality of tubes of a porous material mounted therein in a zig-zag pattern, said liquor discharge line intercommunicating with the said tubes in each of said food containers, drain lines mounted in the bottom portions of each of said food containers, said tubes in said food containers intercommunicating with said drain lines, said drain lines intercommunicating with said liquor return duct, filter means mounted in said liquor return duct, said chemical separator constructed and adapted to process food therein by fermenting raw materials in said fermentation tank, transferring said raw materials to said processing tank through said transfer conduit, passing liquor from said liquor storage tank through said liquor discharge line into said processing tank and said processing tank agitator, said liquor absorbing nutrients from said processing tank through the said porous walls of said inner portion and said agitator, said liquor passing into said liquor return duct and through said purging tank and said oxidizing tank and into said liquor discharge line, a portion of said liquor passing through said valve means mounted on said fluid discharge line and into said tubes in said food containers in said product collecting tank, nutrients from said liquor passing through the walls of said tubes and into said food containers, the remaining portion of said liquor passing into said liquor return duct and into said storage tank.

3. A chemical separator comprising, in combination, a fermentation tank, means to agitate materials within said tank, temperature control means therein, a processing tank having an outer tank and an inner portion of porous material, means to transfer said materials from said fermentation tank into said inner tank, hollow porous agitator means mounted in said inner tank, liquor return means in said processing tank, said liquor return means intercommunicating with said processing tank agitator means, a liquor storage tank intercommunicating with said liquor return means, carbon dioxide purging means and oxidizing means mounted in said liquor return means adjacent said storage tank, means to discharge liquor from said storage tank, said liquor discharge means intercommunicating with said processing agitator means and between said processing inner tank and said processing outer tank, food storage means having a plurality of food containers mounted therein, said containers having porous means therein to pass nutrients through said porous means for storage in said container, said food containers intercommunicating wtih said liquor discharge means on a top portion thereof, the bottom portion of said food containers intercommunicating with said liquor return means, filter means mounted in said liquor return means, said separator constructed and adapted to process food materials into concentrated edible food.

4. A method of processing raw materials into concentrated edible food comprising, the steps of (1) placing a mixture of finely ground raw materials and water into a container, (2) maintaining the temperature of said mixture at approximately 98 degrees F., (3) agitating said mixture for approximately eight hours, fermenting said mixture during said agitation and exhausting carbon dioxide and methane gases therefrom, (4) transferring the resulting mixture into a processing tank having a porous inner portion and into said inner portions thereof, (5) agitating said last-named mixture with a hollow porous agitator while maintaining the temperature of said mixture at approximately 98 degrees F., (6) adding enzymes to said last-named mixture, (7) circulating a nutrient collecting liquor around said inner portion and through said hollow agitator for approximately four to six hours, (8) directing the resulting liquor through a carbon dioxide purging means and exhausting carbon dioxide therefrom, (9) directing the resulting liquor through an oxidizing means and adding oxygen thereto, (10) directing the lighter portion of the resulting liquor into food collecting containers having porous tubes, and into said tubes therein, nutrients passing from said fluid through said tubes and into said containers, (11) filtering impurities from said last-named liquor, (12) recirculating the remainder of last-named liquor as described in steps 7, 8, 9, 10 and 11 hereof, (13) continuing said last-named steps for approximately ten to twelve hours while maintaining the temperature of said containers at approximately 98 degrees F., and (14) maintaining pressure on the fluid during said last-named steps in surges of approximately 180 surges per minute.

5. A method of processing of raw materials into concentrated edible food comprising the steps of (1) placing a mixture of raw materials into a container, (2) agitating and fermenting said mixture for approximately eight hours, (3) transferring the resulting mixture into the inner portion of a processing tank having a porous inner portion, (4) adding enzymes and agitating said last-named mixture with a hollow porous agitator, (5) circulating a nutrient collecting liquid around said inner portion and through said hollow agitator for approximately four to six hours, (6) purging carbon dioxide from said resulting liquor, (7) oxidizing the said resulting liquor, (8) directing the lighter portions of the resulting liquor into food collecting containers having porous tubes and into said tubes, (9) passing nutrients from said last-named liquor through said tubes and into said containers, (10) filtering impurities from said last-named liquor, (11) recirculating the remainder of the last-named liquor as described in steps 7, 8, 9, 10 and 11 hereof for approximately ten to twelve hours, (12) maintaining the temperature of said containers, liquor, and mixtures, at approximately 98 degrees F. throughout all steps hereof.

6. A method of processing raw materials into edible food comprising:
 (1) placing a mixture of raw materials into a container,
 (2) fermenting said mixture therein,
 (3) transferring the resulting fermented mixture into the porous inner portion of a processing tank,
 (4) adding enzymes and therein agitating said last-named mixture,
 (5) circulating a nutrient collecting liquid around said porous inner portion, and collecting nutrients therein passed through the pores of said porous inner portion,
 (6) oxidizing the resulting liquor,
 (7) directing lighter portions of the resulting liquor into food collecting containers having porous tubes, and into said tubes,
 (8) passing nutrients from said last-named liquor through the walls of said tubes and into said containers, and
 (9) recirculating the remainder of the said last-named liquor as described in steps 6, 7, and 8 hereof.

References Cited

UNITED STATES PATENTS

| 2,244,902 | 6/1941 | Stich | 195—142 XR |
| 3,120,511 | 2/1964 | Tanaka et al. | 195—28 XR |
| 3,231,385 | 1/1966 | Ziro et al. | 99—54 |
| 3,276,971 | 10/1966 | Tone et al. | 195—28 |
| 3,355,296 | 8/1967 | Perkins et al. | 99—9 |

RAYMOND N. JONES, *Primary Examiner.*

H. H. KLARE III, *Assistant Examiner.*

U.S. Cl. X.R.

99—237; 195—29, 141, 143